(12) United States Patent
Yamamoto et al.

(10) Patent No.: US 11,981,769 B2
(45) Date of Patent: May 14, 2024

(54) POLYURETHANE FOAM

(71) Applicant: THE YOKOHAMA RUBBER CO., LTD., Tokyo (JP)

(72) Inventors: Yutaro Yamamoto, Hiratsuka (JP); Kazushi Kimura, Hiratsuka (JP); Hirokazu Kageyama, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 589 days.

(21) Appl. No.: 17/278,107

(22) PCT Filed: Sep. 19, 2019

(86) PCT No.: PCT/JP2019/036857
§ 371 (c)(1),
(2) Date: Mar. 19, 2021

(87) PCT Pub. No.: WO2020/059831
PCT Pub. Date: Mar. 26, 2020

(65) Prior Publication Data
US 2021/0347933 A1 Nov. 11, 2021

(30) Foreign Application Priority Data
Sep. 20, 2018 (JP) ................. 2018-175776

(51) Int. Cl.
*C08G 18/44* (2006.01)
*C08G 18/42* (2006.01)
*C08G 18/48* (2006.01)
*C08G 18/76* (2006.01)
*C08G 101/00* (2006.01)

(52) U.S. Cl.
CPC ......... *C08G 18/44* (2013.01); *C08G 18/4202* (2013.01); *C08G 18/4854* (2013.01); *C08G 18/7664* (2013.01); *C08G 2101/00* (2013.01); *C08G 2110/0058* (2021.01); *C08G 2110/0066* (2021.01); *C08G 2110/0083* (2021.01)

(58) Field of Classification Search
CPC .......................... C08G 18/44; C08G 18/4202; C08G 18/4854; C08G 18/7664; C08G 2110/008
See application file for complete search history.

(56) References Cited

U.S. PATENT DOCUMENTS

| | | | | |
|---|---|---|---|---|
| 4,267,120 A | * | 5/1981 | Cuscurida | C08G 63/64 528/80 |
| 5,290,905 A | * | 3/1994 | Komiya | D01F 6/70 528/80 |
| 2012/0136085 A1 | | 5/2012 | Choi et al. | |
| 2019/0193488 A1 | | 6/2019 | Kimura et al. | |

FOREIGN PATENT DOCUMENTS

| | | | |
|---|---|---|---|
| DE | 10 2015 014 864 A1 | | 5/2017 |
| JP | 2004-291725 A | | 10/2004 |
| JP | 2012-117039 A | | 6/2012 |
| JP | 2013-199514 A | | 10/2013 |
| JP | 2013199514 A | * | 10/2013 |
| JP | 2016-044238 A | | 4/2016 |
| JP | 2018-001847 A | | 1/2018 |
| JP | 2019-151727 A | | 9/2019 |
| JP | 2019151813 A | * | 9/2019 |
| WO | WO-2016039395 A1 | * | 3/2016 ............. C08G 18/00 |

OTHER PUBLICATIONS

JP-2019151813-A_09-2019_english translation.*
JP-2013199514-A_10-2013_english translation.*
Brereton, G. et al., Polyurethanes in Ullmann's Encyclopedia Of Industrial Chemistry, Jul. 23, 2019, URL:https://doi.org/10.1002/14356007.a21_665.pub3, 76 pages.

* cited by examiner

*Primary Examiner* — Michael L Leonard
(74) *Attorney, Agent, or Firm* — Carrier, Shende & Associates P.C.; Joseph P. Carrier; Fulchand P. Shende

(57) ABSTRACT

A polyurethane foam is obtained by foaming a blend containing a polyol and a polyisocyanate. The polyol contains a polycarbonate diol that has a polyester structure and a polycarbonate diol obtained by developing a polymerization reaction using 1,5-pentanediol and 1,6-hexanediol. The polyurethane foam has a density from 0.1 to 0.4 g/cm$^3$.

7 Claims, No Drawings

POLYURETHANE FOAM

TECHNICAL FIELD

The present invention relates to a polyurethane foam obtained by foaming a blend containing a polyol and a polyisocyanate.

BACKGROUND ART

As a technique for causing a vehicle to run in cases such as a puncture of a tire, a run-flat tire system is known in which a core (support body) that is separate from the tire is disposed in a cavity region between the tire and the rim, for supporting a tire tread portion by the core in the case of a puncture. As the support body, for example, a support body with a polyurethane foam as material is known (Patent Document 1).

CITATION LIST

Patent Literature

Patent Document 1: JP 2004-291725 A

SUMMARY OF INVENTION

Technical Problem

In the run-flat tire system mentioned above, the support body is required to have adequate mechanical strength for supporting the load of the vehicle. In contrast, the support body is also required to be lightweight.

An object of the present invention is to provide a polyurethane foam that is excellent in mechanical strength while being lightweight.

Solution to Problem

An aspect of the present invention is a polyurethane foam obtained by foaming a blend including a polyol and a polyisocyanate, the polyol includes: a polycarbonate diol that has a polyester structure; and a polycarbonate diol obtained by developing a polymerization reaction using 1,5-pentanediol and 1,6-hexanediol, and the polyurethane foam has a density from 0.1 to 0.4 g/cm$^3$.

The blending ratio between the polycarbonate diol that has the polyester structure and the polycarbonate diol obtained by developing the polymerization reaction using the 1,5-pentanediol and the 1,6-hexanediol is preferably from 1:99 to 99:1 in terms of ratio by mass.

The blending amount of the polycarbonate diol obtained by developing the polymerization reaction using the 1,5-pentanediol and the 1,6-hexanediol is preferably equal to the blending amount of the polycarbonate diol that has the polyester structure, or larger than the blending amount of the polycarbonate diol that has the polyester structure.

The polyol preferably further includes another polyol, in addition to the polycarbonate diol that has the polyester structure and the polycarbonate diol obtained by developing the polymerization reaction using the 1,5-pentanediol and the 1,6-hexanediol.

The flexural strength at 5% strain in accordance with JIS K7221-2 is preferably 50 N/cm$^2$ or more, and the bending strength is preferably 400 N/cm$^2$ or more.

The compressive strength at 10% strain in accordance with JIS K7220 is preferably 30 N/cm$^2$ or more.

The compression set in accordance with JIS K6767 is preferably 10% or less.

The blend preferably further includes water and contains from 1 to 5 parts by mass of the water with respect to 100 parts by mass of the polyol.

The blend preferably further includes at least one selected from the group consisting of a filler, a fiber, an adhesion-imparting agent, a surfactant, and an anti-aging agent.

Advantageous Effects of Invention

According to the aspect mentioned above, a polyurethane foam that is excellent in mechanical strength while being lightweight is obtained.

DESCRIPTION OF EMBODIMENTS

Hereinafter, a polyurethane foam according to the present embodiment is described.

Polyurethane Foam

A polyurethane foam is obtained by foaming a blend containing a polyol and a polyisocyanate.

The polyol is a component having two or more hydroxyl groups in one molecule. In the present embodiment, the polyol contains two different types of polycarbonate diols: (1) a polycarbonate diol that has a polyester structure (hereinafter, also referred to as polycarbonate diol 1); and (2) a polycarbonate diol obtained by developing a polymerization reaction using 1,5-pentanediol and 1,6-hexanediol (hereinafter, also referred to as polycarbonate diol 2). The blend containing such polyols is foamed to obtain a polyurethane foam that has a low density with excellent flexural strength, bending strength, compressive strength, and compression set. It is to be noted that in this specification, the flexural strength refers to bending strength at 5% strain, measured in accordance with JIS K7221-2, and the bending strength refers to bending strength (maximum bending strength) in the case of fracture by further strain in excess of 5%. In addition, in this specification, the compressive strength refers to compressive strength at 10% strain (10% deforming compressive stress), measured in accordance with JIS K7220. The compression set refers to compression set measured in accordance with JIS K6767.

When the polycarbonate diol 2 of the two types of polycarbonate diols mentioned above is not contained, at least any of the flexural strength, bending strength, compressive strength, or compression set of the polyurethane foam will be inadequate. More specifically, the mechanical strength (hereinafter, also referred to simply as "strength") of the polyurethane foam is insufficient. In addition, when the polycarbonate diol 1 of the two types of polycarbonate diols mentioned above is not contained, the polyurethane foam will satisfy predetermined flexural strength, but will become brittle because of the low bending strength. Furthermore, the compressive strength of the polyurethane foam will be inadequate.

The polycarbonate diol 1 is a polycarbonate diol that has a polyester structure. The polyester structure typically refers to a structure obtained by a dehydration condensation reaction between a diol and a dicarboxylic acid. The polycarbonate diol 1 has a structure represented by the following general formula (1), and a terminal hydroxyl group.

$$\text{—[—R—O(CO)O—]}_1\text{—} \quad (1)$$

Among the repeating units of the structure of the general formula (1) included in the polycarbonate diol 1, each R represents an independent alkylene group having 1 to 12 carbon atoms, and the structure of the general formula (1) partially includes the polyester structure. 1 is an integer from 1 to 20.

The number average molecular weight of the polycarbonate diol 1 is preferably from 300 to 3000.

For the polycarbonate diol 1, for example, NIPPOLLAN 981, 980R, and 982R from Tosoh Corporation can be used alone, or two or more thereof can be used in a combination. The NIPPOLLAN 981 has a number average molecular weight of 1000 in general formula (1). The NIPPOLLAN 980R and 982R have a number average molecular weight of 2000.

The polycarbonate diol 2 is a polycarbonate diol obtained by developing a polymerization reaction, with 1,5-pentanediol and 1,6-hexanediol and a carbonate compound as raw materials. More specifically, the polycarbonate diol 2 has a structure represented by the following general formula (2), and a terminal hydroxyl group.

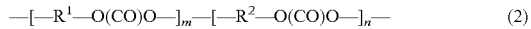

$$-[-R^1-O(CO)O-]_m-[-R^2-O(CO)O-]_n-\quad (2)$$

In general formula (2), $R^1$ and $R^2$ are different from each other and are either $(CH_2)_5$ or $(CH_2)_6$. m and n are each an integer of 2 to 12.

The number average molecular weight of the polycarbonate diol 2 is preferably from 300 to 3000.

For the polycarbonate diol 2, for example, DURANOL T5650E, T5650J, T5651, and T5652 from Asahi Kasei Corp. can be used alone, or two or more thereof can be used in a combination. The DURANOL T5650E has, in the general formula (2), m and n each of approximately 2, and a number average molecular weight of 500. The DURANOL T5650J has, in the general formula (2), m and n each of approximately 3, and a number average molecular weight of 800. The DURANOL T5651 has, in the general formula (2), m and n each of approximately 4, and a number average molecular weight of 1000. The DURANOL T5652 has, in the general formula (2), m and n each of approximately 8, and a number average molecular weight of 2000.

The blending ratio between the polycarbonate diol 1 and the polycarbonate diol 2 is preferably from 99:1 to 1:99, more preferably from 90:10 to 10:90, in terms of ratio by mass.

In addition, from the perspective of enhancing the mechanical strength of the polyurethane foam, the blending amount (mass) of the polycarbonate diol 2 is preferably equal to the blending amount (mass) of the polycarbonate diol 1 or larger than the blending amount (mass) of the polycarbonate diol 1, more preferably larger than the blending amount (mass) of the polycarbonate diol 1. In this case, the blending ratio between the polycarbonate diol 1 and the polycarbonate diol 2 is preferably from 1:1.5 to 1:5, more preferably from 1:2 to 1:4 in terms of ratio by mass.

The polyol may further contain other polyols in addition to the polycarbonate diols 1, 2 mentioned above. For the other polyols, for example, polycarbonate polyols other than the polycarbonate diols 1, 2, polyether polyols, polyester polyols, and other polyols can be used alone, or two or more thereof can be used in combination.

Polycarbonate polyols other than the polycarbonate diols 1, 2 are produced through a reaction such as a methanol elimination-condensation reaction between a polyol and dimethyl carbonate, a phenol elimination-condensation reaction between a polyol and a diphenyl carbonate, or an ethylene glycol elimination-condensation reaction between a polyol and an ethylene carbonate. Examples of the polyols for use in these reactions include: various saturated or unsaturated glycols such as 1,6-hexanediol, diethylene glycol, triethylene glycol, propylene glycol, 1,3-butanediol, 1,4-butanediol, neopentyl glycol, pentanediol, 3-methyl-1,5-pentanediol, octanediol, 1,4-butyndiol, dipropylene glycol, tripropylene glycol, and polytetramethylene ether glycol; and alicyclic glycols such as 1,4-cyclohexane diglycol, and 1,4-cyclohexanedimethanol.

Examples of the polyether polyols include: polyols obtained by adding at least one selected from ethylene oxides, propylene oxides, butylene oxides, styrene oxide, and the like to at least one type selected from polyhydric alcohols such as ethylene glycol, diethylene glycol, propylene glycol, dipropylene glycol, glycerin, 1,1,1-trimethylolpropane, 1,2,5-hexanetriol, 1,3-butanediol, 1,4-butanediol, 4,4'-dihydroxyphenylpropane, 4,4'-dihydroxyphenylmethane, and pentaerythritol; and polyoxytetramethylene oxides.

Examples of the polyester polyol include: condensation polymers from one, or two or more of ethylene glycol, propylene glycol, butandiol, pentanediol, hexanediol, cyclohexanedimethanol, glycerin, 1,1,1-trimethylolpropane, and other low molecular weight polyols and one, or two or more of glutaric acid, adipic acid, pimelic acid, suberic acid, sebacic acid, terephthalic acid, isophthalic acid, dimer acid, and other low molecular weight carboxylic acids and oligomeric acids; and ring-opened polymers such as propiolactone and valerolactone.

Examples of the other polyols include polymer polyols; polybutadiene polyols; hydrogenated polybutadiene polyols; acrylic polyols; and low molecular weight polyols such as ethylene glycol, diethylene glycol, propylene glycol, dipropylene glycol, butanediol, pentanediol, hexanediol, polyethylene glycol laurylamines (e.g., N,N-bis(2-hydroxyethyl)laurylamine), polypropylene glycol laurylamines (e.g., N,N-bis(2-methyl-2-hydroxyethyl)laurylamine), polyethylene glycol octylamines (e.g., N,N-bis(2-hydroxyethyl)octylamine), polypropylene glycol octylamines (e.g., N,N-bis(2-methyl-2-hydroxyethyl)octylamine), polyethylene glycol stearylamines (e.g., N,N-bis(2-hydroxyethyl)stearylamine), polypropylene glycol stearylamines (e.g., N,N-bis(2-methyl-2-hydroxyethyl)stearylamine), and tris-(2-hydroxyethyl)isocyanurate.

The blending amount of the other polyols that may be contained in the polyol besides the polycarbonate diols 1, 2 as mentioned above is preferably from 1 to 15 parts by mass with respect to 100 parts by mass of the total amount of the polycarbonate diols 1, 2.

The polyisocyanate is not particularly limited as long as the polyisocyanate has two or more isocyanate groups in one molecule, and a known polyisocyanate is used.

Examples of the known polyisocyanate include: diisocyanate compounds, e.g., aromatic polyisocyanates such as tolylene diisocyanate (TDI), diphenylmethane diisocyanate (MDI), phenylene diisocyanate, xylylene diisocyanate (XDI), tetramethylxylylene diisocyanate (TMXDI), tolidine diisocyanate (TODI), and naphthalene diisocyanate (NDI), aliphatic polyisocyanates such as hexamethylene diisocyanate (HDI), trimethylhexamethylene diisocyanate (TMHDI), lysine diisocyanate, and norbornane diisocyanate methyl (NBDI), and alicyclic polyisocyanates such as transcyclohexane-1,4-diisocyanate, isophorone diisocyanate (IPDI), H6XDI (hydrogenated XDI), H12MDI (hydrogenated MDI), and H6TDI (hydrogenated TDI); polyisocyanate compounds such as polymethylene polyphenylene polyisocyanates; carbodiimide-modified polyisocyanates of these isocyanate compounds; isocyanurate-modified polyisocyanates of these isocyanate compounds; and urethane prepolymers obtained by reacting these isocyanate compounds with the polyol compounds mentioned above as examples, and these compounds may be used alone, or two or more thereof may be used in combination.

The polyisocyanate is preferably a polymer containing an isocyanate group in the repeating unit, specifically, having: one or more repeating units each with an isocyanate group; and an end with an isocyanate group, that is, a polymeric polyisocyanate, preferably. Among the known polyisocyanates mentioned above, the polymethylene polyphenylene polyisocyanates are preferably used.

In the blend mentioned above, the equivalent ratio of isocyanate groups in the polyisocyanate to hydroxyl groups in the polyol is preferably from 0.8 to 1.2. If the equivalent ratio is less than 0.8, the mechanical strength of the polyurethane foam may be inadequate. If the equivalent ratio exceeds 1.2, the polyurethane foam may become brittle.

The blend further contains water, and preferably contains from 1 to 5 parts by mass of water with respect to 100 parts by mass of the polyol. Containing water in the range mentioned above accelerates the foaming reaction between the water and the polyisocyanate to an appropriate extent, and thus makes it easier to adjust the density of the polyurethane foam to from 0.1 to 0.4 $g/cm^3$. The blending amount of water is preferably from 2 to 4 parts by mass with respect to 100 parts by mass of the polyol.

The above-mentioned blend preferably further includes, in addition to the polyol, the polyisocyanate, and water, at least one selected from the group consisting of fillers, fibers, adhesion-imparting agents, surfactants, and anti-aging agents, to the extent that the object of the present invention is not impaired. Furthermore, the blend may further include a catalyst, a foam stabilizer, and the like.

The above-mentioned blend is prepared, for example, as a main agent composed of the polyisocyanate and a curing agent including all of the components excluding the polyisocyanate.

The density of the polyurethane foam according to the present embodiment is from 0.1 to 0.4 $g/cm^3$. The density in this range is obtained by foaming the above-described blend to produce a polyurethane foam. The density in the range mentioned above is lower than those of known polyurethane foams, and the polyurethane foam according to the present embodiment is lightweight.

In contrast, because the polyurethane foam according to the present embodiment is produced with the use of the blend mentioned above, preferably, flexural strength is 50 $N/cm^2$ or more and bending strength is 400 $N/cm^2$ or more. In addition, because the polyurethane foam according to the present embodiment is produced with the use of the blend mentioned above, preferably, compressive strength is 30 $N/cm^2$ or more. Furthermore, because the polyurethane foam according to the present embodiment is produced with the use of the blend mentioned above, preferably, compression set is not greater than 10%. More specifically, the polyurethane foam according to the present embodiment has excellent mechanical strength.

As described above, the polyurethane foam according to the present embodiment is excellent in mechanical strength while being lightweight, and can be used in various applications. For example, in the case where the polyurethane foam is used for a support body for a run-flat tire system, a lightweight support body with excellent run-flat durability can be obtained. The "run-flat durability" refers to a property evaluated with the length of the run-flat mileage.

The density of the polyurethane foam is preferably from 0.15 to 0.3 $g/cm^3$.

The flexural strength of the polyurethane foam is more preferably 60 $N/cm^2$ or more. In contrast, the upper limit of the flexural strength is, for example, 90 $N/cm^2$.

The bending strength of the polyurethane foam is more preferably 500 $N/cm^2$ or more. In contrast, the upper limit of the bending strength is, for example, 700 $N/cm^2$.

The compressive strength of the polyurethane foam is more preferably 35 $N/cm^2$ or more. In contrast, the upper limit of the compressive strength is, for example, 60 $N/cm^2$.

The compression set of the polyurethane foam is more preferably 8% or less. In contrast, the lower limit of the compression set is, for example, 5%.

In the case where the polyurethane foam with compression set of 10% or less is used as the support body mentioned above, the amount of deformation of the polyurethane form repeatedly subjected to a load at high speed during run-flat travel is small, with excellent run-flat durability.

The polyurethane foam according to the present embodiment can be, as described above, suitably used as a support body for a run-flat tire system. The support body is specifically a plurality of members in an annular form or divided in a tire circumferential direction, disposed in a cavity region between a tire and a rim. The support body is fixed to, for example, the surface on the inner side in a tire radial direction of the tread portion of the tire (the innerliner surface of the tire in contact with the cavity region). Alternatively, the support body is fixed to, for example, the surface on the outer side in the radial direction of the rim in contact with the cavity region. The support body can be fixed to the tire or rim with the use of an adhesive, a pressure-sensitive adhesive, a cushioning material, a foam molded body, other mechanically fixing means, or the like.

Furthermore, the polyurethane foam according to the present embodiment has excellent mechanical strength while being lightweight as described above, can be used in various fields such as, in addition to the support body of the run-flat tire system, for example, ships, vehicles, plants, heat-insulating devices, buildings and structures, home appliances, and furniture, and in these fields, can be used as reinforcing materials, heat-insulating materials, core materials, buoyant materials, heat-retaining members, covers, lids, anti-vibration agents, packaging materials, mold materials, and the like.

The form of the polyurethane foam is not particularly limited, and may take various forms such as an annular shape, a block shape, a rod shape, a plate shape, and a sheet shape.

The polyurethane foam can be used, for example, in conjunction with a structure composed of rubber, plastic, metal, or the like. Specifically, the polyurethane foam is used, being disposed in the interior space of a structure such as a hollow, tubular, or box-shaped structure, being sandwiched between a plurality of structures such as plate-shaped structures, or being fixed to a surface of a structure.

The material and shape of the structure is, depending on the application, selected from the perspective of achieving both weight reduction and mechanical strength.

Method for Producing Polyurethane Foam

The polyurethane foam according to the present embodiment is produced with the use of a blend containing a polyol and a polyisocyanate. The blend described herein is composed in an identical manner as the blend mentioned above.

Specifically, the main agent, curing agent, and water constituting the blend are mixed to react and polymerize the polyisocyanate and the polyol, react the polyisocyanate and the water and then generate a carbon dioxide gas (foaming) in the polymer, and thus produce a polyurethane foam.

The polyurethane foam can be, after molding the polyurethane foam into a predetermined shape in advance with the use of a mold, disposed in the internal space of the structure. Alternatively, the polyurethane foam can be produced by foaming the blend in the internal space of the structure, with the structure as a mold.

Experiment

For investigating the effects of embodiments of the present invention, polyurethane foams are produced, and the density, flexural strength, bending strength, compressive strength, and compression set thereof are measured.

The blends used for the production of the polyurethane foams are prepared by blending raw materials in accordance with the blending amounts shown in Table 1.

TABLE 1

|  | Examples | | | | Comparative Example | | | | |
| --- | --- | --- | --- | --- | --- | --- | --- | --- | --- |
|  | 1 | 2 | 3 | 4 | 1 | 2 | 3 | 4 | 5 |
| Polycarbonate Diol 1 | 80 | 50 | 20 | 45 | 50 |  | 100 |  |  |
| Polycarbonate Diol 2 | 20 | 50 | 80 | 45 | 50 |  |  | 100 |  |
| Polycarbonate Diol 3 |  |  |  |  |  |  |  |  | 100 |
| Polytetramethylene Ether Glycol |  |  |  | 10 |  | 100 |  |  |  |
| Amine Compound | 0.4 | 0.4 | 0.4 | 0.4 | 0.4 | 0.4 | 0.4 | 0.4 | 0.4 |
| Foam Stabilizer | 1.2 | 1.2 | 1.2 | 1.2 | 1.2 | 1.2 | 1.2 | 1.2 | 1.2 |
| Polymeric Isocyanate Compound 1 | 100 | 100 | 100 | 100 | 100 | 100 | 100 | 100 | 40 |
| Polymeric Isocyanate Compound 2 |  |  |  |  |  |  |  |  | 40 |
| Water | 4 | 3 | 2 | 3 | 10 | 3 | 3 | 3 | 10 |
| Density (g/cm$^3$) | 0.18 | 0.21 | 0.25 | 0.20 | 0.08 | 0.15 | 0.22 | 0.23 | 0.15 |
| Flexural Strength (N/cm$^2$) | 68 | 75 | 81 | 71 | 21 | 33 | 45 | 51 | 83 |
| Bending Strength (N/cm$^2$) | 582 | 613 | 677 | 591 | 177 | 258 | 390 | 315 | 681 |
| Compressive Strength (N/cm$^2$) | 34 | 51 | 56 | 42 | 13 | 21 | 24 | 38 | 51 |
| Compression Set (%) | 8 | 6 | 8 | 9 | 29 | 21 | 11 | 13 | 14 |

For the raw materials shown in Table 1, the following materials are used. In the table, the amounts of raw materials are shown in terms of parts by mass.

Polycarbonate Diol 1: NIPPOLLAN 982R, from Tosoh Corporation

Polycarbonate Diol 2: DURANOL T5650J, from Asahi Kasei Corp.

Polycarbonate Diol 3: DURANOL T5651, from Asahi Kasei Corp.

Polytetramethylene Ether Glycol: PTMG1000, from Mitsubishi Chemical Corporation

Amine Compound: 1,4-azabicyclo [2.2.2]octane, from Tokyo Chemical Industry Co., Ltd.

Foam Stabilizer: FZ3703 (silicone oil), manufactured by Dow Corning Toray Co., Ltd.

Polymeric Isocyanate Compound 1: SUMIDULE 44V20 (polymethylene polyphenyl polyisocyanate), from Sumika Bayer Urethane Co., Ltd., NCO group content = 31%

Polymeric Isocyanate Compound 2: SUMIDULE 44V10 (polymethylene polyphenyl polyisocyanate), from Sumika Bayer Urethane Co., Ltd., NCO group content = 31%

In Comparative Example 5, although not shown in the table, 0.5 parts by mass of tin octylate (NEOSTANN U-28, available from Nitto Kasei Co., Ltd.) are added as a catalyst.

The prepared blends are stirred at room temperature (25° C.) for 1 minute, immediately poured into a mold in predetermined shape, and foamed. Foaming is no longer observed at about 30 seconds after the start of foaming. Thereafter, the reactants are left to stand for 24 hours to complete the foaming and the polymerization reactions, and thus obtaining the test samples according to Example 1 to 4 and Comparative Example 1 to 5. The properties of the produced test samples are measured in the following manner. The results are shown in Table 1.

Density

The measurement is performed in accordance with JIS K7222. Thus, the case of 0.1 to 0.4 g/cm$^3$ is evaluated as a successful reduction in weight.

Flexural Strength, Bending Strength

In accordance with JIS K7221-2, bending tests are performed under conditions of temperature: 23° C., humidity: 50%, and movement velocity of pressure wedge: 20 mm/min, and the bending strength of the test sample at 5% strain is measured. Subsequently, the test sample is subjected to strain in excess of 5%, and the bending strength of the test sample at break is measured.

Compressive Strength

In accordance with JIS K7220, compression tests are performed under conditions of temperature: 23° C., humidity: 50%, and movement velocity of movable plate: 20 mm/min, and the compressive strength of the test sample at 10% strain is measured.

Compression Set

The compression set is measured in accordance with JIS K6767. The measurement is performed under the condition of 23° C. for 22 hours.

From the foregoing results, the case of 50 N/cm$^2$ or more in flexural strength, 400 N/cm$^2$ or more in bending strength, 30 N/cm$^2$ or more in compressive strength, and 10% or less in compression set is evaluated as being excellent in mechanical strength.

From the comparison between Examples 1 to 4 and Comparative Examples 1 to 5, it is determined that the polyurethane foams produced with the use of the blends containing both of the polycarbonate diols 1, 2 as the polyol are excellent in mechanical strength while being lightweight.

The foregoing has been a description of the polyurethane foam according to embodiments of the present invention. However, it is understood that the present invention is not limited to the above embodiments and Examples, and may be improved or modified in various ways within the scope of the present invention.

The invention claimed is:

1. A polyurethane foam obtained by foaming a blend comprising a polyol and a polyisocyanate,
   the polyol comprising: a polycarbonate diol that has a polyester structure; and a polycarbonate diol obtained by developing a polymerization reaction using 1,5-pentanediol and 1,6-hexanediol,
   a blending amount of the polycarbonate diol obtained by developing the polymerization reaction using the 1,5-pentanediol and the 1,6-hexanediol is equal to a blending amount of the polycarbonate diol that has the polyester structure, or is larger than the blending amount of the polycarbonate diol that has the polyester structure, and
   the polyurethane foam having a density from 0.1 to 0.4 g/cm$^3$.

2. The polyurethane foam according to claim 1, wherein the polyol further comprises another polyol, in addition to the polycarbonate diol that has the polyester structure and the polycarbonate diol obtained by developing the polymerization reaction using the 1,5-pentanediol and the 1,6-hexanediol.

3. The polyurethane foam according to claim 1, wherein a flexural strength of the polyurethane foam at 5% strain in accordance with JIS K7221-2 is 50 N/cm$^2$ or more, and bending strength is 400 N/cm$^2$ or more.

4. The polyurethane foam according to claim 1, wherein a compressive strength of the polyurethane foam at 10% strain in accordance with JIS K7220 is 30 N/cm$^2$ or more.

5. The polyurethane foam according to claim 1, wherein a compression set of the polyurethane foam in accordance with JIS K6767 is 10% or less.

6. The polyurethane foam according to claim 1, wherein the blend further comprises water and contains from 1 to 5 parts by mass of the water with respect to 100 parts by mass of the polyol.

7. The polyurethane foam according to claim 1, wherein the blend further comprises at least one selected from the group consisting of a filler, a fiber, an adhesion-imparting agent, a surfactant, and an anti-aging agent.

* * * * *